(12) United States Patent
Waltermire et al.

(10) Patent No.: US 10,604,304 B2
(45) Date of Patent: Mar. 31, 2020

(54) INSULATED BAG WITH HANDLES

(71) Applicant: Pratt Retail Specialties, LLC, Conyers, GA (US)

(72) Inventors: Jamie Waltermire, Peachtree City, GA (US); Paul Ott, Atlanta, GA (US); Greg Sollie, Sharpsburg, GA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 0 days.

(21) Appl. No.: 15/590,345

(22) Filed: May 9, 2017

(65) Prior Publication Data
US 2018/0327172 A1 Nov. 15, 2018

(51) Int. Cl.
| | | |
|---|---|---|
| *B65D 81/38* | (2006.01) | |
| *B65D 33/12* | (2006.01) | |
| *B65D 33/16* | (2006.01) | |
| *A45C 11/20* | (2006.01) | |
| *A45C 7/00* | (2006.01) | |

(52) U.S. Cl.
CPC .............. *B65D 33/16* (2013.01); *A45C 11/20* (2013.01); *B65D 33/12* (2013.01); *A45C 7/0059* (2013.01)

(58) Field of Classification Search
CPC .............. B65D 81/3888; B65D 81/389; B65D 81/3893; B65D 81/3897; B65D 33/10; B65D 33/105; B65D 33/12; B65D 33/06
USPC ..... 383/109, 110, 12, 14, 20, 18, 19, 82, 83, 383/85, 88, 26–31, 30, 121–125, 17, 6, 383/21, 25; 220/915.1, 915.2
See application file for complete search history.

(56) References Cited

U.S. PATENT DOCUMENTS

| | | | |
|---|---|---|---|
| 265,985 | A | 10/1882 | Seabury |
| 1,747,980 | A | 2/1930 | Kondolf |
| 1,753,813 | A | 4/1930 | Washburn |
| 1,868,996 | A | 7/1932 | Sharp |
| 1,896,393 | A | 2/1933 | Devine |

(Continued)

FOREIGN PATENT DOCUMENTS

| | | |
|---|---|---|
| CA | 2019104 | 12/1991 |
| CN | 206494316 | 9/2017 |

(Continued)

OTHER PUBLICATIONS

JP2012126440Translation.*

(Continued)

*Primary Examiner* — Jes F Pascua
*Assistant Examiner* — Nina K Attel
(74) *Attorney, Agent, or Firm* — Taylor English Duma LLP

(57) ABSTRACT

An insulated bag includes a pair of opposing main panels; a pair of opposing side panels, each side panel attached to each main panel, the main panels and the side panels defining a bag cavity within the insulated bag; and a handle assembly, the handle assembly comprising a handle portion attached to a base portion; the main panels and the side panels defined in an insulated blank, the insulated blank comprising an insulation batt, a first sheet, and a second sheet, the insulation batt encapsulated between the first sheet and the second sheet, the first sheet attached in facing engagement with the second sheet to form a border, the border extending around a perimeter of the insulation batt, the base portion of the handle laminated within the border.

20 Claims, 12 Drawing Sheets

(56) References Cited

U.S. PATENT DOCUMENTS

| | | |
|---|---|---|
| 1,899,892 A | 2/1933 | D'Este et al. |
| 1,937,263 A | 11/1933 | Bubb |
| 1,942,917 A * | 1/1934 | Este .................. B65D 31/04 383/110 |
| 1,954,013 A | 4/1934 | Lilienfield |
| 2,070,747 A | 2/1937 | Ostrom |
| 2,148,454 A | 2/1939 | Gerard |
| 2,386,905 A | 10/1945 | Meitzen |
| 2,389,601 A | 11/1945 | De Witt |
| 2,554,004 A | 5/1951 | Bergstein |
| 2,650,016 A | 8/1953 | McMillan |
| 2,753,102 A | 7/1956 | Paige |
| 2,899,103 A | 8/1959 | Ebert |
| 2,927,720 A | 3/1960 | Adams |
| 2,987,239 A | 6/1961 | Atwood |
| 3,029,008 A | 4/1962 | Membrino |
| 3,031,121 A | 4/1962 | Chase |
| 3,065,895 A | 11/1962 | Lipschutz |
| 3,097,782 A | 7/1963 | Koropatkin et al. |
| 3,182,913 A | 5/1965 | Brian |
| 3,222,843 A | 12/1965 | Schneider |
| 3,236,206 A | 2/1966 | Willinger |
| 3,282,411 A | 11/1966 | Jardine |
| 3,335,941 A * | 8/1967 | Frederick ............... A45C 13/26 383/15 |
| 3,371,462 A | 3/1968 | Nordkvist et al. |
| 3,420,363 A | 1/1969 | Blickensderfer |
| 3,435,736 A * | 4/1969 | Reiche .................. B65D 31/08 383/103 |
| 3,551,945 A | 1/1971 | Eyberg et al. |
| 3,703,383 A | 11/1972 | Kuchenbecker |
| 3,734,336 A | 5/1973 | Rankow et al. |
| 3,747,743 A | 7/1973 | Hoffmann, Jr. |
| 3,749,299 A | 7/1973 | Ingle |
| 3,836,044 A | 9/1974 | Tilp et al. |
| 3,890,762 A | 6/1975 | Ernst et al. |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,169,540 A | 10/1979 | Larsson et al. |
| 4,211,267 A | 7/1980 | Skovgaard |
| 4,335,844 A | 6/1982 | Egli |
| 4,380,314 A | 4/1983 | Langston, Jr. et al. |
| 4,418,864 A | 12/1983 | Neilsen |
| 4,488,623 A | 12/1984 | Linnell, II et al. |
| 4,509,645 A | 4/1985 | Hotta |
| 4,679,242 A | 7/1987 | Brockhaus |
| 4,682,708 A | 7/1987 | Pool |
| 4,819,793 A | 4/1989 | Willard et al. |
| 4,828,133 A | 5/1989 | Hougendobler |
| 4,889,252 A | 12/1989 | Rockom et al. |
| 4,930,903 A | 6/1990 | Mahoney |
| 5,016,813 A | 5/1991 | Simons |
| 5,062,527 A | 11/1991 | Westerman |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,263,339 A | 11/1993 | Evans |
| 5,372,429 A | 12/1994 | Beaver, Jr. et al. |
| 5,418,031 A | 5/1995 | English |
| 5,441,170 A | 8/1995 | Bane, III |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,512,345 A | 4/1996 | Tsutsumi et al. |
| 5,516,580 A | 5/1996 | Frenette et al. |
| 5,596,880 A | 1/1997 | Welker et al. |
| 5,613,610 A | 3/1997 | Bradford |
| 5,638,978 A | 6/1997 | Cadiente |
| 5,842,571 A | 12/1998 | Rausch |
| 5,906,290 A | 5/1999 | Haberkorn |
| 5,996,366 A | 12/1999 | Renard |
| 6,003,719 A | 12/1999 | Steward, III |
| 6,041,958 A | 3/2000 | Tremelo |
| 6,050,412 A | 4/2000 | Clough et al. |
| 6,138,902 A | 10/2000 | Welch |
| 6,164,526 A | 12/2000 | Dalvey |
| 6,168,040 B1 | 1/2001 | Sautner et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,325,281 B1 | 12/2001 | Grogan |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,618,868 B2 | 9/2003 | Minnick |
| 6,688,133 B1 | 2/2004 | Donefrio |
| 6,725,783 B2 | 4/2004 | Sekino |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,899,229 B2 | 5/2005 | Dennison et al. |
| 6,910,582 B2 | 6/2005 | Lantz |
| 6,971,539 B1 | 12/2005 | Abbe |
| 7,000,962 B2 | 2/2006 | Le |
| 7,019,271 B2 | 3/2006 | Wnek et al. |
| 7,094,192 B2 | 8/2006 | Schoenberger et al. |
| 7,225,970 B2 | 6/2007 | Philips |
| 7,229,677 B2 | 6/2007 | Miller |
| 7,392,931 B2 | 7/2008 | Issler |
| D582,676 S | 12/2008 | Rothschild |
| 7,597,209 B2 | 10/2009 | Rothschild et al. |
| 7,677,406 B2 | 3/2010 | Maxson |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 8,118,177 B2 | 2/2012 | Drapela et al. |
| 8,365,943 B2 | 2/2013 | Bentley |
| 8,465,404 B2 | 6/2013 | Hadley |
| 8,763,886 B2 | 7/2014 | Hall |
| 8,795,470 B2 | 8/2014 | Henderson et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| D758,182 S | 6/2016 | Sponselee |
| 9,408,445 B2 | 8/2016 | Mogil et al. |
| 9,429,350 B2 | 8/2016 | Chapman, Jr. |
| 9,605,382 B2 | 3/2017 | Virtanen |
| 9,611,067 B2 | 4/2017 | Collison |
| 9,738,420 B2 | 8/2017 | Miller |
| 9,834,366 B2 | 12/2017 | Giuliani |
| 9,908,684 B2 | 3/2018 | Collison |
| 9,920,517 B2 | 3/2018 | Sollie |
| 9,950,830 B2 | 4/2018 | De Lesseux et al. |
| 9,981,797 B2 | 5/2018 | Aksan et al. |
| 10,266,332 B2 | 4/2019 | Aksan et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 2001/0010312 A1 | 8/2001 | Mogil |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2006/0053828 A1 | 3/2006 | Shallman et al. |
| 2006/0096978 A1 | 5/2006 | Lafferty et al. |
| 2007/0000932 A1 | 1/2007 | Cron et al. |
| 2007/0000983 A1 | 1/2007 | Spurrell et al. |

(56) References Cited

U.S. PATENT DOCUMENTS

| | | |
|---|---|---|
| 2007/0051782 A1 | 3/2007 | Lantz |
| 2008/0095959 A1 | 4/2008 | Warner et al. |
| 2008/0173703 A1 | 7/2008 | Westerman et al. |
| 2008/0190940 A1 | 8/2008 | Scott |
| 2008/0203090 A1 | 8/2008 | Dickinson |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0283578 A1 | 11/2009 | Miller |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Nicolucci |
| 2010/0151164 A1 | 6/2010 | Grant et al. |
| 2010/0282827 A1 | 11/2010 | Padovani |
| 2010/0284634 A1 | 11/2010 | Hadley |
| 2011/0042449 A1 | 2/2011 | Copenhaver et al. |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2012/0031957 A1 | 2/2012 | Whitaker |
| 2012/0145568 A1 | 6/2012 | Collison et al. |
| 2012/0243808 A1* | 9/2012 | de Lesseux ........ B65D 81/3897 383/110 |
| 2012/0251818 A1 | 10/2012 | Axrup et al. |
| 2013/0112694 A1 | 5/2013 | Bentley |
| 2013/0112695 A1 | 5/2013 | Hall |
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1* | 9/2014 | Mogil .................... A45C 3/001 383/3 |
| 2014/0319018 A1 | 10/2014 | Collison |
| 2014/0367393 A1 | 12/2014 | Ranade |
| 2015/0110423 A1 | 4/2015 | Fox et al. |
| 2015/0166244 A1 | 6/2015 | Wood et al. |
| 2015/0175338 A1 | 6/2015 | Culp et al. |
| 2015/0239639 A1 | 8/2015 | Wenner et al. |
| 2016/0015039 A1 | 1/2016 | Pierce |
| 2016/0060017 A1 | 3/2016 | De Lesseux et al. |
| 2016/0304267 A1 | 10/2016 | Aksan |
| 2016/0325915 A1 | 11/2016 | Aksan |
| 2017/0015080 A1 | 1/2017 | Collison et al. |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0215525 A1 | 8/2018 | Vogel et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0327171 A1 | 11/2018 | Waltermire et al. |
| 2019/0032991 A1 | 1/2019 | Waltermire et al. |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0382186 A1 | 12/2019 | Sollie et al. |
| 2019/0390892 A1 | 12/2019 | Waltermire et al. |

FOREIGN PATENT DOCUMENTS

| | | | |
|---|---|---|---|
| DE | 1897846 | | 7/1964 |
| DE | 102011016500 | | 10/2012 |
| EP | 0133539 | | 2/1985 |
| EP | 2990196 | | 3/2016 |
| GB | 713640 | | 8/1954 |
| JP | 01254557 | A * | 10/1989 |
| JP | 2005139582 | | 6/2005 |
| JP | 2005247329 | | 9/2005 |
| JP | 2012126440 | A * | 7/2012 |
| WO | 9726192 | | 7/1997 |
| WO | 9932374 | | 7/1999 |
| WO | 2001070592 | | 9/2001 |
| WO | 2014147425 | | 9/2014 |
| WO | 2016187435 | A2 | 5/2016 |
| WO | 2016187435 | A3 | 11/2016 |
| WO | 2018089365 | | 5/2018 |
| WO | 2018093586 | | 5/2018 |
| WO | 2019125904 | | 6/2019 |
| WO | 2019125906 | | 6/2019 |
| WO | 2019226199 | | 11/2019 |

OTHER PUBLICATIONS

Waltermire, Jamie; Non-Final Office Action for U.S. Appl. No. 15/482,200, filed Apr. 7, 2017, dated Jun. 11, 2018, 36 pgs.

Greenblue; "Environmental Technical Briefs of Common Packaging Materials—Fiber-Based Materials", Sustainable Packaging Solution, 2009, 19 pgs.

MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.

Un Packaging; Article entitled: "CooLiner®Insulated Shipping Bags", available at <http://www.chem-tran.com/packaging/supplies/cooliner-insulated-shipping-bags.php>, accessed on Aug. 30, 2017, 2 pgs.

MP Global Products, LLC; International Search Report and Written Opinion of the International Searching Authority for PCT/US2017/060403, filed Nov. 7, 2017, dated Feb. 19, 2018, 15 pgs.

American Bag Company; Article entitled: "Cool Green Bag, Small", located at <http://hotcoldbags.com/items/Cool%20Green%20Bag,%20Small>, accessed on Mar. 20, 2017, 2 pgs.

Duro Bag; Article entitled: "The Load and Fold Bag", accessed on May 24, 2017, copyrighted Apr. 2017, 3 pgs.

Images of Novolex bag, including an outer paper bag, a corrugated cardboard insert, and an inner foil-covered bubble-wrap bag, publicly available prior to May 9, 2017, 7 pgs.

Tera-Pak; Article entitled: "Insulated Shipping Containers", located at <http://www.tera-pak.com/>, accessed on Mar. 20, 2017, 3 pgs.

Waltermire, Jamie; Final Office Action for U.S. Appl. No. 15/482,200, filed Apr. 7, 2017, dated Jan. 2, 2019, 23 pgs.

Waltermire, Jamie; Non-Final Office Action for U.S. Appl. No. 15/590,349, filed May 9, 2017, dated Nov. 5, 2018, 41 pgs.

Collison, Alan B.; Applicant Interview Summary for U.S. Appl. No. 15/677,738, filed Aug. 15, 2017, dated Dec. 5, 2018, 4 pgs.

Collison, Alan B.; Non-Final Office Action for U.S. Appl. No. 15/677,738, filed Aug. 15, 2017, dated Oct. 23, 2018, 11 pgs.

Periwrap; Article entitled: "Insulated Solutions", located at <https://www.peri-wrap.com/insulation/>, accessed on Dec. 3, 2018, 5 pgs.

Singh, et al; Article entitled: "Performance Comparison of Thermal Insulated Packaging Boxes, Bags and Refrigerants for Single-parcel Shipments", published Mar. 13, 2007, 19 pgs.

Waltermire, Jamie; Requirement for Restriction/Election for U.S. Appl. No. 15/590,349, filed May 9, 2017, dated Aug. 30, 2018, 10 pgs.

(56) References Cited

OTHER PUBLICATIONS

Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Salazar Packaging; Article entitle: "Custom Packaging and Design", located at <https://salazarpackaging.com/custom-packaging-and-design/>, accessed on Sep. 28, 2017, 2 pgs.
Weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Requirement for Restriction/Election for U.S. Appl. No. 15/663,905, filed Jul. 31, 2017, dated Mar. 21, 2019, 8 pgs.
Sollie, Greg; Non-Final Office Action for U.S. Appl. No. 15/845,545, filed Dec. 18, 2017, dated Mar. 5, 2019, 41 pgs.
Sollie, Greg; Non-Final Office Action for U.S. Appl. No. 15/845,540, filed Dec. 18, 2017, dated Apr. 2, 2019, 50 pgs.
Collison, Alan B.; Applicant Interview Summary for U.S. Appl. No. 15/677,738, filed Aug. 15, 2017, dated Apr. 22, 2019, 4 pgs.
Collison, Alan B.; Final Office ACtion for U.S. Appl. No. 15/677,738, filed Aug. 15, 2017, dated Feb. 28, 2019, 14 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Sollie, Greg; Notice of Allowance for U.S. Appl. No. 15/845,545, filed Dec. 18, 2017, dated Jun. 19, 2019, 20 pgs.
Collison, Alan B.; Corrected Notice of Allowance for U.S. Appl. No. 15/677,738, filed Aug. 15, 2017, dated Jan. 15, 2019, 7 pgs.
Collison, Alan B.; Notice of Allowance for U.S. Appl. No. 15/677,738, filed Aug. 15, 2017, dated Jun. 19, 2019, 10 pgs.
Sollie, Greg; Requirement for Restriction/Election for U.S. Appl. No. 16/382,710, filed Apr. 12, 2019, dated Jul. 15, 2019, 6 pgs.
Periwrap; Article entitled: "Insulated Solutions", located at <https://www.peri-wrap.com/insulation/>, accessed on Dec. 3, 2018, 9 pgs.
Waltermire, Jamie; Non-Final Office Action for U.S. Appl. No. 15/663,905, filed Jul. 31, 2017, dated Jun. 25, 2019, 66 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,349, filed May 9, 2017, dated May 9, 2019, 31 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013. pdf.
Sollie, Greg; Non-Final Office Action for U.S. Appl. No. 15/988,550, filed May 24, 2018, dated May 29, 2019, 48 pgs.
Sollie, Greg; Non-Final Office Action for U.S. Appl. No. 16/280,595, filed Feb. 20, 2019, dated May 29, 2019, 60 pgs.
Sollie, Greg; International Search Report and Written Opinion for PCT Application No. PCT/US18/65459, filed Dec. 13, 2018, dated May 1, 2019, 15 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Non-Final Office Action for U.S. Appl. No. 15/590,349, filed May 9, 2017, dated Sep. 5, 2019, 25 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/382,710, filed Apr. 12, 2019, dated Oct. 10, 2019, 49 pgs.
Sollie, Greg; Non-Final Office Action for U.S. Appl. No. 16/408,981, filed May 10, 2019, dated Aug. 20, 2019, 50 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Notice of Allowance for U.S. Appl. No. 15/663,905, filed Jul. 31, 2017, dated Nov. 4, 2019, 18 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Sollie, Greg; Non-Final Office Action for U.S. Appl. No. 16/567,192, filed Sep. 11, 2019, dated Dec. 10, 2019, 49 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Final Office Action for U.S. Appl. No. 15/590,349, filed May 9, 2017, dated Jan. 6, 2020, 26 pgs.
Waltermire, Jamie; Requirement for Restriction/Election for U.S. Appl. No. 16/526,555, filed Jul. 30, 2019, dated Jan. 17, 2020, 7 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Final Office Action for U.S. Appl. No. 16/381,678, filed Apr. 11, 2019, dated Dec. 30, 2019, 17 pgs.
Collison, Alan B.; Supplemental Notice of Allowance for U.S. Appl. No. 15/671,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Final Office Action for U.S. Appl. No. 16/530,052, filed Aug. 2, 2019, dated Dec. 27, 2019, 49 pgs.

(56) References Cited

OTHER PUBLICATIONS

Sollie, Greg; International Search Report and Written Opinion for PCT Application No. PCT/US19/60486, filed Nov. 18, 2019, dated Jan. 13, 2020, 10 pgs.

Sollie, Greg; Invitation to Pay Additional Fees for PCT/US19/59764, filed Nov. 5, 2019, dated Jan. 2, 2020, 2 pgs.

* cited by examiner

INSULATED BAG WITH HANDLES

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated bag.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated bag comprising a pair of opposing main panels; a pair of opposing side panels, each side panel attached to each main panel, the main panels and the side panels defining a bag cavity within the insulated bag; and a handle assembly, the handle assembly comprising a handle portion attached to a base portion; the main panels and the side panels defined in an insulated blank, the insulated blank comprising an insulation batt, a first sheet, and a second sheet, the insulation batt encapsulated between the first sheet and the second sheet, the first sheet attached in facing engagement with the second sheet to form a border, the border extending around a perimeter of the insulation batt, the base portion of the handle laminated within the border.

Also disclosed is an insulated bag assembly comprising an insulated bag, the insulated bag comprising a pair of opposing main panels and a handle assembly, the main panels defined in an insulated blank, the insulated blank comprising an insulation batt, a first sheet, and a second sheet, the insulation batt encapsulated between the first sheet and the second sheet, the first sheet attached in facing engagement with the second sheet to form a border, the border extending around a perimeter of the insulation batt, a base portion of the handle laminated within the border, the main panels defining a bag cavity within the insulated bag; and an insulated panel, the insulated panel positioned within the bag cavity, the insulated panel forming a seal with the insulated bag.

Also disclosed is a method for forming an insulated bag, the method comprising positioning an insulation batt between a first sheet and a second sheet; attaching the first sheet and the second sheet in facing engagement to form a border, the border extending around a perimeter of the insulation batt, the border encapsulating the insulation batt and forming an insulated blank; laminating a base portion of a handle assembly within the border;

attaching a first portion of the border to a second portion of the border in facing engagement to form a seam; and folding the insulated blank along a fold line to form the insulated bag.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
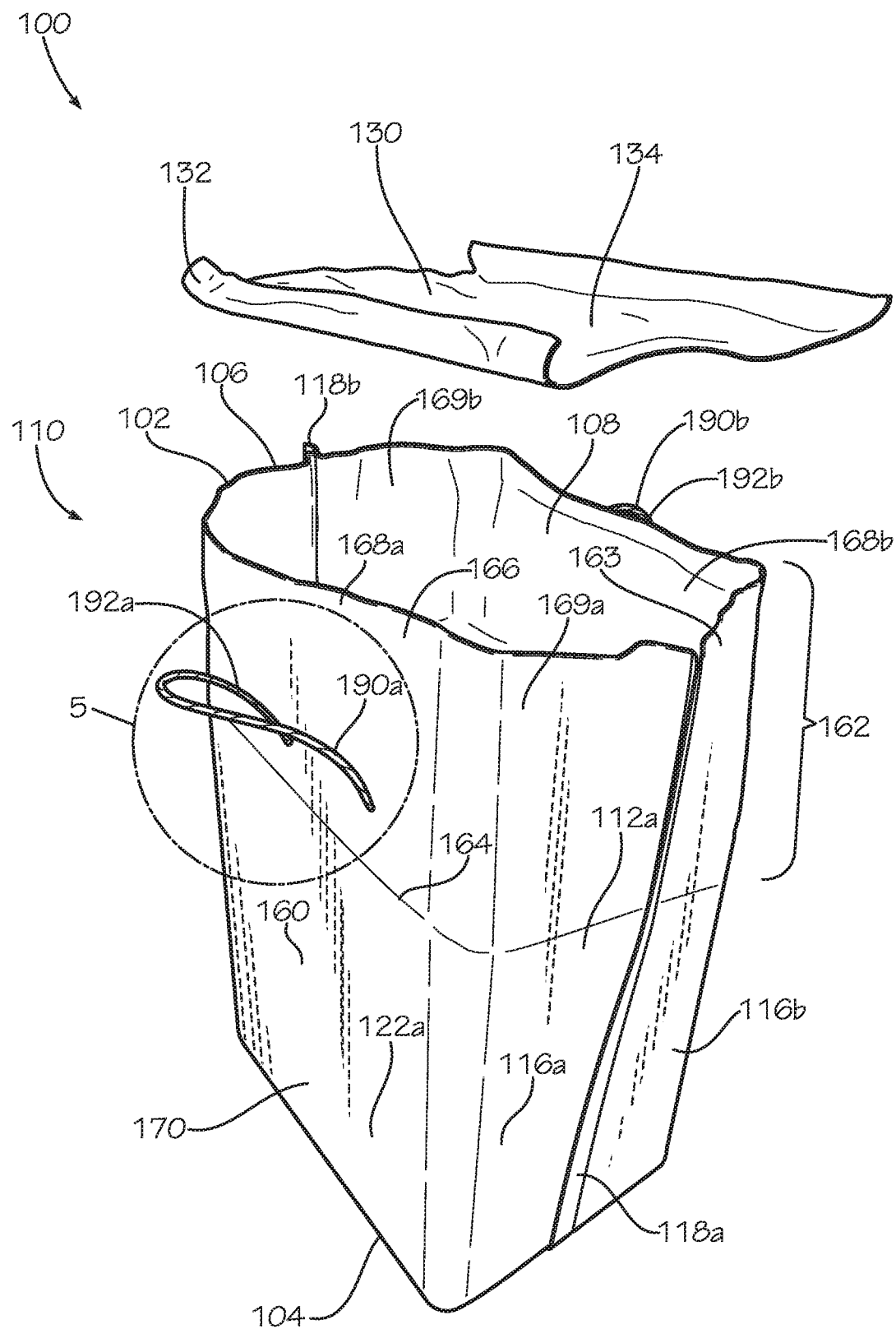
FIG. 1 is a perspective view of an insulated bag assembly comprising an insulated bag and an insulated panel in accordance with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an insulated bag assembly and associated methods, systems, devices, and various apparatus. The insulated bag assembly comprises an insulated bag and an insulated panel. It would be understood by one of skill in the art that the disclosed insulated bag assembly is described in but a few exemplary embodiments among many. No particular terminology or description should be considered limiting on the disclosure or the scope of any claims issuing therefrom.

FIG. 1 is a perspective view of an insulated bag assembly 100 in accordance with one aspect of the present disclosure in an open configuration. The insulated bag assembly 100 can comprise an insulated bag 110 and an insulated panel 130. The insulated bag 110 can be formed from an insulated blank 170, as shown and further described below with respect to FIG. 7C.

Figure 3:
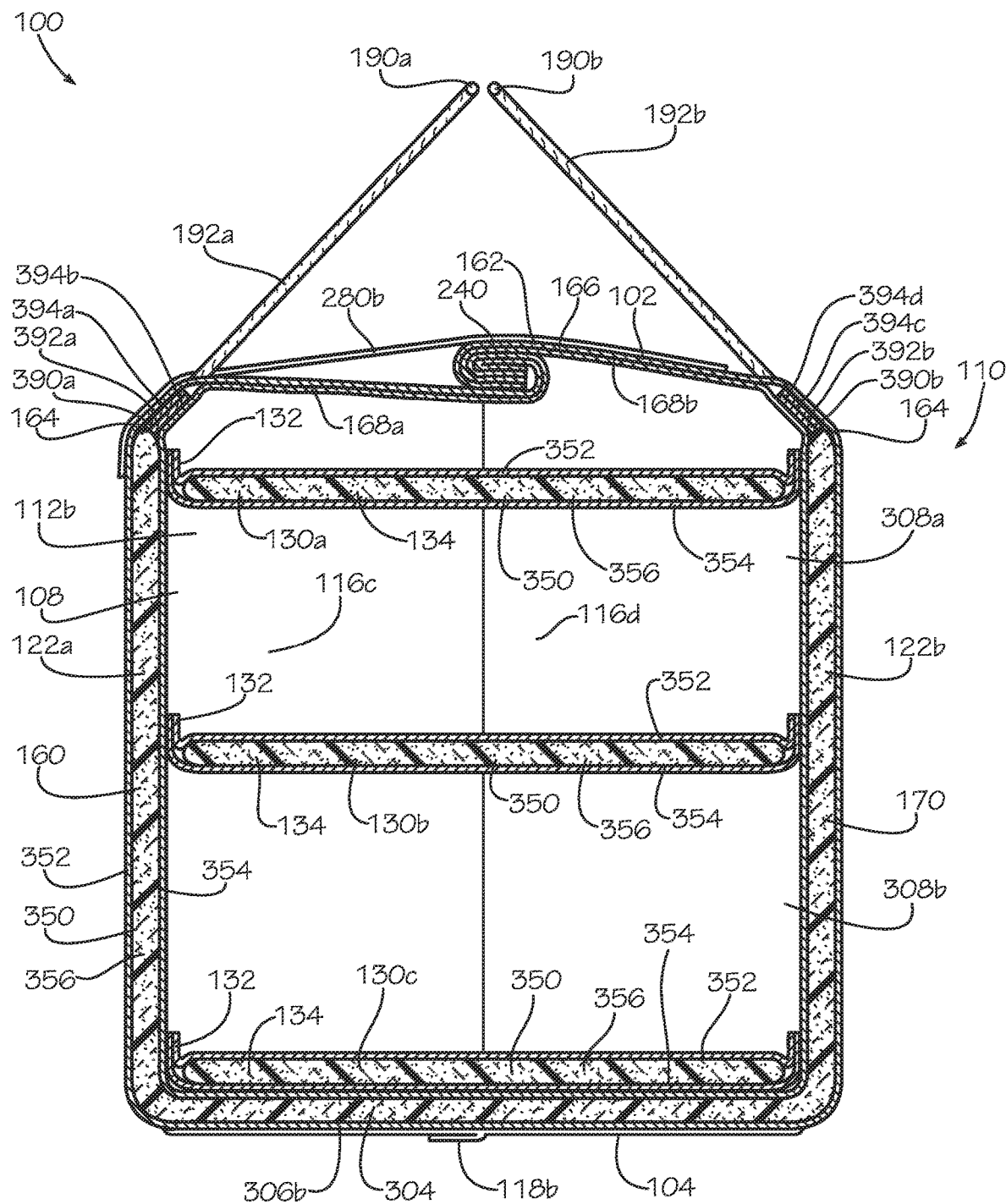
FIG. 3 is a cross-section of the insulated bag assembly of FIG. 2 taken along line 3-3 shown in FIG. 2.

The insulated bag 110 can comprise a pair of opposing main panels 122a,b (122b shown in FIG. 3), a pair of opposing side panels 112a,b (112b shown in FIG. 3), and a pair of handle assemblies 190a,b. Each side panel 112a,b can be attached to each main panel 122a,b, and each side panel 112a,b can be substantially perpendicular to each main panel 122a,b. In the present aspect, the first side panel 112a can comprise a first side subpanel 116a and a second side subpanel 116b joined together by a first side seam 118a. The second side panel 112b, as shown in FIG. 3, can comprise a third side subpanel 116c and a fourth side subpanel 116d joined together by a second side seam 118b (shown in FIG. 4). The first side seam 118a and the second side seam 118b can be disposed substantially opposite from one another, and each side seam 118a,b can bisect the respective side panel 112a,b.

The insulated bag 110 can define a top end 102 and a bottom end 104. The top end 102 can be disposed opposite from the bottom end 104. An extended neck portion 162 can be disposed proximate to the top end 102 of the insulated bag 110. The extended neck portion 162 can extend from the top end 102 to a taper line 164 of the insulated bag 110. The taper line 164 can be positioned between the top end 102 and the bottom end 104 at a top of each main panel 122a,b and each side panel 112a,b. The taper line 164 can be a boundary between an insulated portion 160 and an uninsulated portion 163 of the insulated bag 110. The uninsulated portion 163 can be defined by a border 166 extending around the insulated blank 170, and the extended neck portion 162 can be a portion of the border 166. The main panels 122a,b and the side panels 112a,b can define the insulated portion 160 of the insulated blank 170.

In the present aspect, the extended neck portion 162 of the border 166 can be attached to both of the main panels 122a,b and both of the side panels 112a,b. The extended neck portion 162 can define a first main neck portion 168a disposed above the first main panel 122a and a second main neck portion 168b disposed above the second main panel 122b (shown in FIG. 3). The extended neck portion 162 can also define a first side neck portion 169a disposed above the first side panel 112a and a second side neck portion 169b disposed above the second side panel 112b (shown in FIG. 3). In other aspects, the extend neck portion 162 may only be attached to the main panels 122a,b or may only be attached to the side panels 112a,b. In still other aspects, the extend neck portion 162 may only be attached to a one of the main panels 122a,b or a one of the side panels 112a,b.

In the present aspect, the handles assemblies 190a,b can be respectively attached to the main neck portions 168a,b of the extended neck portion 162. Each handle assembly 190a,b can comprise a handle portion 192a,b which can extend out from the extended neck portion 162 of the border 166. In other aspects, each handle assembly 190a,b can be respectively attached to the side neck portions 169a,b. In still other aspects, each handle assembly 190a,b can be attached to either a one of the main panels 122a,b or a one of the side panels 112a,b.

The main panels 122a,b, the side panels 112a,b, and the extended neck portion 162 of the border 166 can define a bag cavity 108 within the insulated bag 110. The top end 102 of the insulated bag 110 can define a bag opening 106 to the bag cavity 108. In the open configuration, the bag opening 106 can be unsealed, and the bag cavity 108 can be exposed. The insulated panel 130 can define an insulated portion 134 encompassed by a border 132 of the insulated panel 130. In the present aspect, the insulated portion 134 of the insulated panel 130 can be sized and shaped complimentary to a horizontal cross-section of the bag cavity 108. The insulated panel 130 can be configured to be placed within the bag cavity 108 to provide insulated to the bag cavity 108.

Figure 2:
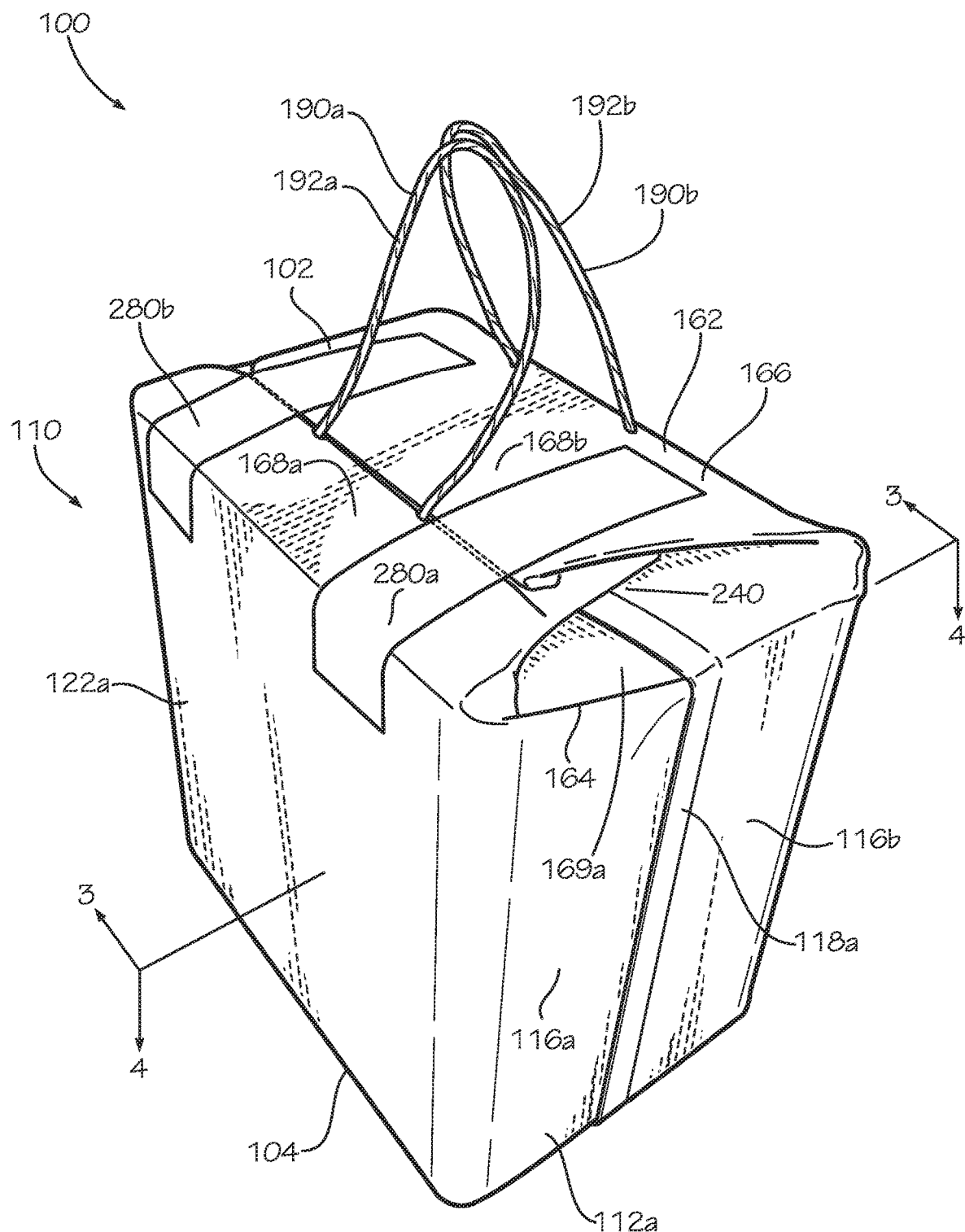
FIG. 2 is a perspective view of the insulated bag assembly of FIG. 1 in a closed configuration.

FIG. 2 is a perspective view of the insulated bag assembly 100 of FIG. 1. The insulated bag of the insulated bag assembly 100 is shown in a closed configuration. In the closed configuration, the extended neck portion 162 of the border 166 can be configured to form a roll top seal 240. To form the roll top seal 240, the opposing side neck portions 169a,b (side neck portion 169b shown in FIG. 1) can be folded inwards towards the bag cavity 108 (shown in FIG. 1). The opposing main neck portions 168a,b can then be rolled together over the inwardly folded side neck portions 169a,b to seal the bag opening 106 and enclose the bag cavity 108.

In the present aspect, the roll top seal 240 can be secured by a pair of tape strips 280a,b. The tape strips 280a,b can attach to both the first main neck portion 168a and the second main neck portion 168b to prevent the roll top seal 240 from unrolling. In the open configurations, the tape strips 280a,b can be attached to either the first main neck portion 168a or the second main neck portion 169b, and an unattached end of the tape strips 280a,b can be covered with a backing strip which covers an adhesive such as a glue, epoxy, cement, mastic, cohesive, or other suitable material. The user can remove the backing strip to expose the adhesive and secure the unattached end to the opposite main neck portion 168a,b. The tape strips 280a,b can also attach one or both of the main panels 122a,b as shown. With the opposing main neck portions 168a,b rolled together, the handle portions 192a,b of the respective handle assemblies 190a,b are positioned together such that a user can easily grip both handle portions 192a,b with one hand.

FIG. 3 is a cross-section of the insulated bag assembly 100 of FIG. 2 taken along line 3-3 shown in FIG. 2. The handle portions 192a,b can be flexible, and in the aspect of FIG. 3, the handle portions 192a,b can be shown in a more vertical orientation. Additionally, the roll top seal 240 can be formed and positioned differently dependent upon a height of the extended neck portion 162 and how much material from the first main neck portion 168a and the second main neck portion 168b is rolled together to form the roll top seal 240. Either configuration is acceptable, and the shape and position of the roll top seal 240 between the handle portions 192a,b is not limiting.

The insulated bag 110 can further comprise a bottom panel 304 disposed at the bottom end 104 of the insulated bag 110. The bottom panel 304 can further define the bag cavity 108. The bottom panel 304 can be attached to each of the main panels 122a,b and the side panels 112a,b. A pair of corner ears 306a,b (306a shown in FIG. 8B) can be folded beneath the bottom panel 304 and attached in facing engagement to the bottom panel 304. In the present aspect, the corner ears 306a,b, can be attached to the bottom panel 304 with an adhesive such as a glue, cement, epoxy, mastic, double-sided tape, cohesive, or any other suitable material, or by a mechanical method such as stapling, stitching, or any other suitable method. Each corner ear 306a,b can be defined by a portion of the border 166.

As previously stated, the insulated bag 110 can be formed from the insulated blank 170. The insulated blank 170 can comprise an insulation batt 350, a first sheet 352, and a second sheet 354. The portion of the insulated blank 170 containing the insulation batt 350 can define the insulated portion 160 of the insulated bag 110. In the present aspect, the bottom panel 304 can further define the insulated portion 160 of the insulated bag 110. The insulation batt 350 can be encapsulated in a panel cavity 356 defined between the first sheet 352 and the second sheet 354. The border 166 can extend around a perimeter of the insulation batt 350, thereby sealing the panel cavity 356.

The border 166 can be formed by attaching the first sheet 352 and the second sheet 354 together in facing engagement around the insulation batt 350. In the present aspect, the first sheet 352 can be attached to the second sheet 354 with an adhesive such as a glue, epoxy, cement, mastic, cohesive, or other suitable material. In other aspects, the first sheet 352 and the second sheet 354 can be attached together by a mechanical method such as stapling, stitching, or any other suitable method. The taper line 164 can be defined by the first sheet 352 and the second sheet 354 sloping together from the insulated portion 160 towards the border 166.

The handle assemblies 190a,b can further comprise a base portion 390a,b, respectively. In the present aspect, the base portion 390a,b of each handle assembly 190a,b can comprise a base strip 392a,b, respectively. The base strip 392a can comprise a first strip 394a and a second strip 394b attached together in facing engagement. A pair of bottom portions 792a,b (shown in FIG. 7B) of the handle portion 192a can be laminated between the first strip 394a and the second strip 394b to secure the handle portion 192a to the base portion 390a. The base strip 392b can comprise a third strip 394c and a fourth strip 394d attached together in facing engagement. A pair of bottom portions 792c,d (shown in FIG. 7B) of the handle portion 192b can be laminated between the third strip 394c and the fourth strip 394d to secure the handle portion 192b to the base portion 390b.

The base strip 392a,b of each handle assembly 190a,b can be laminated within the extended neck portion 162 of the border 166, between the first sheet 352 and the second sheet 354 of the insulated blank 170. In the present aspect, the handle portion 192a,b of each handle assembly 190a,b can extend outwards through the first sheet 352 of the border 166. In other aspects, the handle portion 192a,b can extend outwards between the first sheet 352 and the second sheet 354 (shown in FIG. 3).

When held by a user, the handle portion 192a can align with the base strip 392a, and the handle portion 192b can align with the base strip 392b. The base strips 392a,b can contact the insulation batt 350, and the interface between the insulation batt 350 and the base strips 392a,b can act as pivot points. The handle assemblies 190a,b and the roll top seal 240 can define a substantially "A"-shaped side profile. The extended neck portion 162 can comprise enough material that the extended neck portion 162 is not pulled taught between the main panels 122a,b which allows the extended neck portion 162, the roll top seal 240, the base strips 392a,b, and the insulated panel 130a (further described below) to form a substantially trapezoidal-shaped side profile. A geometry of the "A"-shaped side profile of the handle assemblies 190a,b and the roll top seal 240 and the trapezoidal-shaped side profile can cooperate to minimize upward force and outward tension acting on the roll top seal 240 and the tape strips 280 to prevent the extended neck portion 162 from being pulled open when carrying a heavy payload in the insulated bag assembly 100.

In the present aspect, the insulated bag assembly 100 can comprise three insulated panels 130a-c disposed within the bag cavity 108. Each insulated panel 130a-c can be constructed similar to the insulated blank 170, and each insulated panel 130a-c can comprise the first sheet 352, the second sheet 354, and the insulation batt 350. The border 132 can be construction with the first sheet 352 in facing engagement with the second sheet 354, similar to the border 166. The border 166 can form a seal within the bag cavity 108 by contacting the second sheet 354 of the insulated bag 110. The insulated portion 134 can contain the insulation batt 350 encapsulated within the panel cavity 356 between the first sheet 352 and the second sheet 354, similar to the insulated portion 160.

The insulated panel 130a can be positioned proximate the roll top seal 240, and the insulated panel 130a can provide insulation for the top end 102 of the insulated bag 110. The insulated panel 130b can be positioned within the bag cavity 108 between the top end 102 and the bottom end 104, and the insulated panel 130b can divide the bag cavity 108 into a first compartment 308a and a second compartment 308b. Such a configuration can be desirable for packaging both hot and cold contents within the bag cavity 108, or other contents that need to be stored at different temperature relative to each other. For example, hot contents can be placed within the first compartment 308a, and cold contents can be placed within the second compartment 308b, or vice versa. In such aspects, the insulated panel 130b can insulate the cold contents from the hot contents. In the present aspect, the insulated panel 130b can be oriented horizontally; however, in other aspects, the insulated panel 130b can be oriented vertically or obliquely to divide the bag cavity 108 into compartments 308a,b. In other aspects, additional insulated panels 130 can be positioned within the bag cavity 108 to divide the bag cavity 108 into more than two compartments 308a,b. In some aspects, both horizontally oriented and vertically oriented insulated panels 130 can be disposed within the bag cavity 108.

The insulated panel 130c can be positioned atop the bottom panel 304, and the insulated panel 130c can further insulate the bottom end 104 of the insulated bag 110. In the present aspect, the bottom panel 304 can be insulated; however, in other aspects, the bottom panel 304 can be uninsulated, and the insulated panel 130c can provide insulation for the bottom end 104 of the insulated bag 110.

Figure 4:
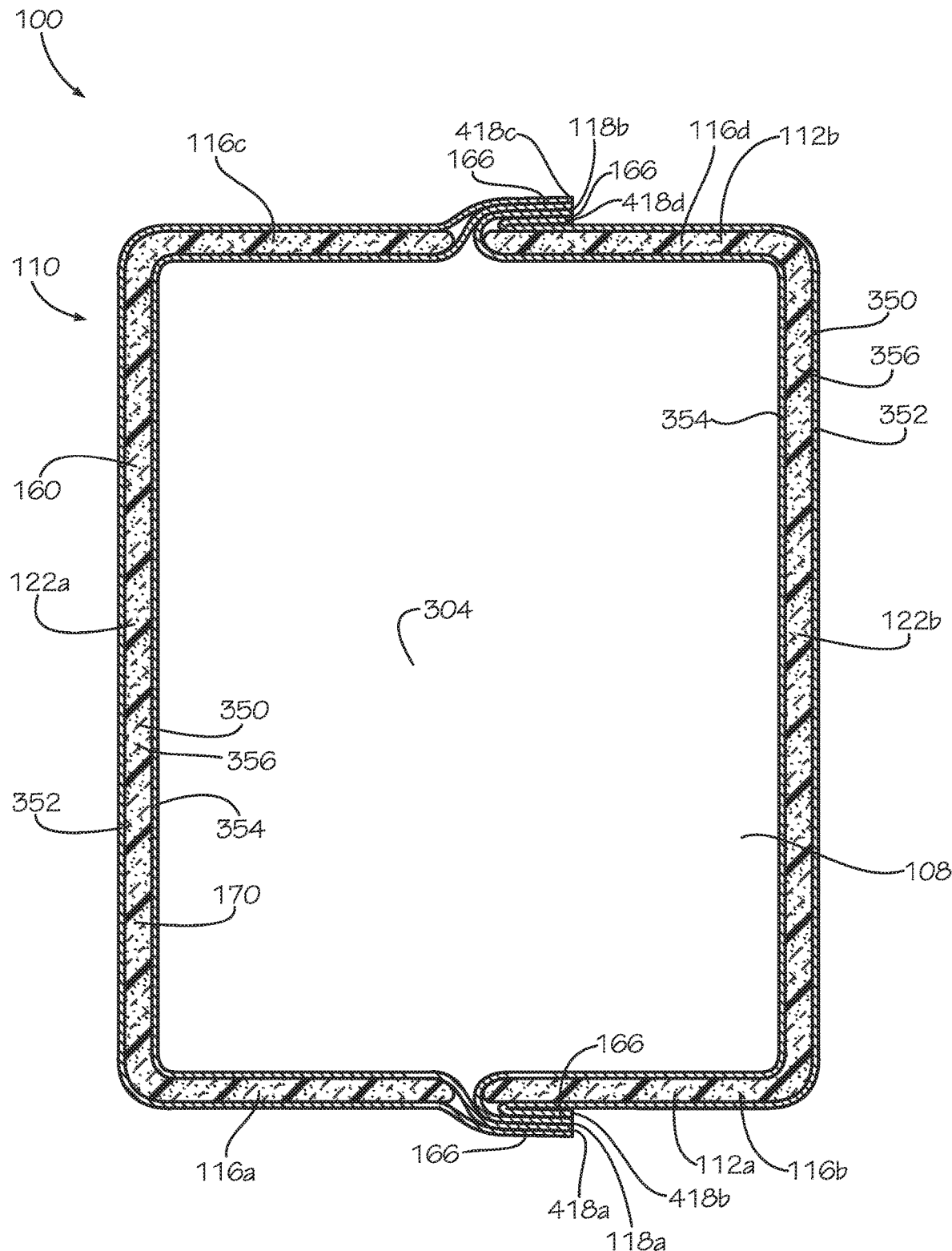
FIG. 4 is a cross-section of the insulated bag assembly of FIG. 2 taken along line 4-4 shown in FIG. 2.

FIG. 4 is a cross section of the insulated bag assembly 100 of FIG. 2 taken along line 4-4 shown in FIG. 2. In the present aspect, the insulated panel 130c has been removed, and the bottom panel 304 is visible. As shown, the border 166 can be a two-ply seam formed by attaching the first sheet 352 to the second sheet 354 in facing engagement. The first side seam 118a and the second side seam 118b can each be four-ply seams. The first side seam 118a can be formed by attaching a first portion 418a of the border 166 in facing engagement with a second portion 418b of the border 166.

The first portion 418a of the border 166 can be defined adjacent to the first side subpanel 116a, and the second portion 418b of the border 166 can be defined adjacent to the second side subpanel 116b. The first side subpanel 116a can be attached to the first main panel 122a. The second side panel 116b can be attached to the second main panel 122b. Attaching the first side panel 116a to the second side panel 116b by forming the first side seam 118a can form the first side panel 112a.

The second side seam 118b can be formed by attaching a third portion 418c of the border 166 in facing engagement with a fourth portion 418d of the border 166. The third portion 418c of the border 166 can be defined adjacent to the third side subpanel 116c, and the fourth portion 418d of the border 166 can be defined adjacent to the fourth side subpanel 116d. The third side subpanel 116c can be attached to the first main panel 122a. The fourth side subpanel 116d can be attached to the second main panel 122b. Attaching the third side subpanel 116c to the fourth side subpanel 116d can form the second side panel 112b. In the present aspects, the portions 418a-d can each be a portion of a continuous border 166 extending around the insulated portion 160 of the insulated blank 170.

In the present aspect, the side seams 118a,b can each lie flat along a one of the side panels 112a,b. In the present aspect, the side seams 118a,b can be creased to lie flat against the side panels 112a,b; however in other aspects, the side seams 118a,b can be attached to the side panels 112a,b, for example and without limitation, by an adhesive. The side seams 118a,b being positioned adjacent to the side panels 112a,b can facilitate handling and loading of the insulated bag assemblies into service carts, crates, pallets, or other containers which can provide minimal spacing between adjacent insulated back assemblies 100. The side seams 118a,b being positioned adjacent to the side panels 112a,b can also avoid interference by the side seams 118a,b during the closure process, such as when rolling the roll top seal 240 (shown in FIG. 3). In other aspects, the side seams 118a,b can be extend outwards from the side panels 112a,b.

Figure 5:
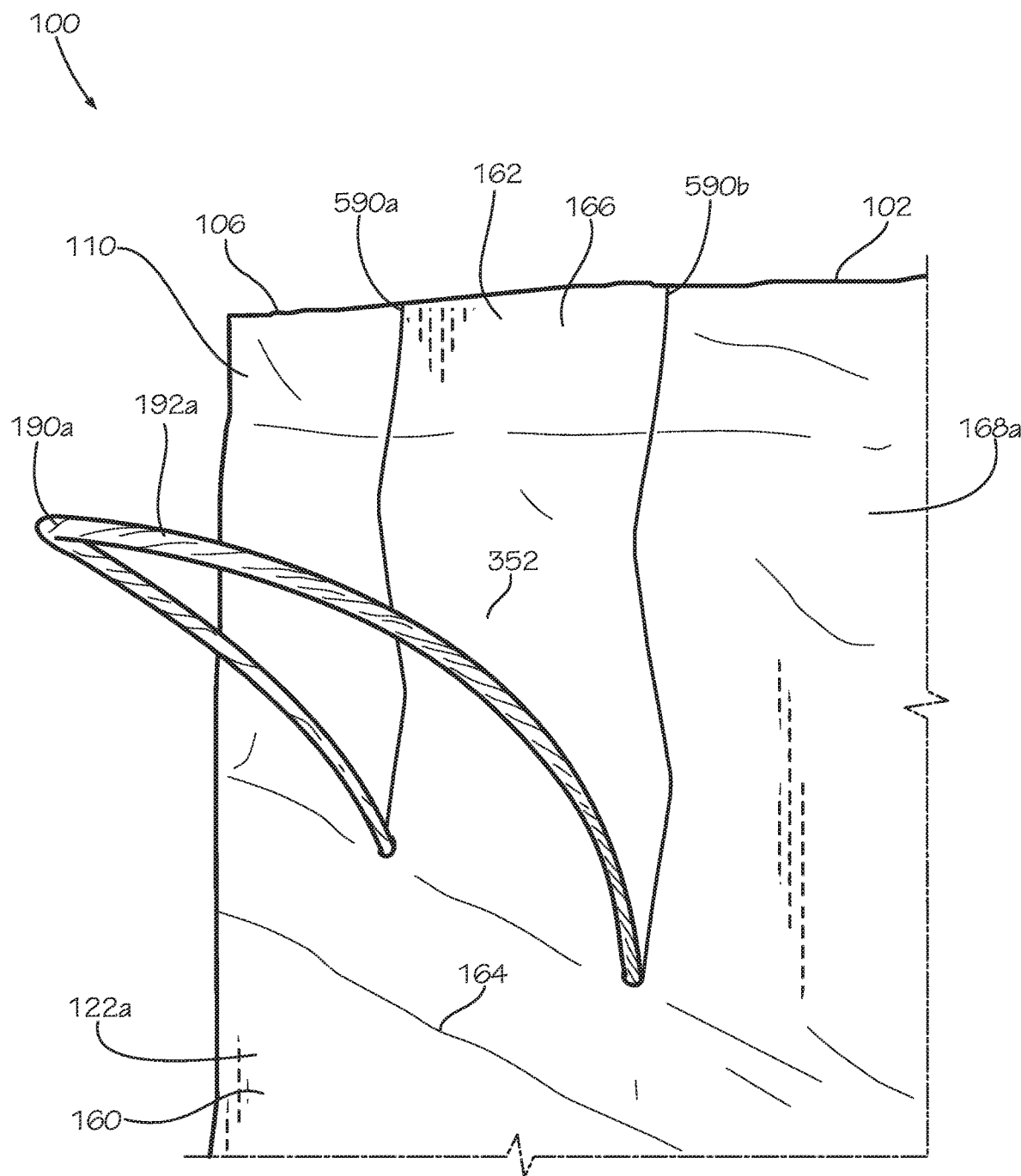
FIG. 5 is a perspective view of a handle assembly of the insulated bag of FIG. 1 taken from Detail 5 shown in FIG. 1.

FIG. 5 is a detail view of the first handle assembly 190a of the insulated bag assembly 100 taken from Detail 5 shown in FIG. 1. As previously stated, the handle portion 192a of the handle assembly 190a can extend outwards from the extended neck portion 162 of the border 166. The first sheet 352 can define a first slit 590a and a second slit 590b extending upwards to the top end 102 of the insulated bag 110. The handle portion 192a can extend through the first sheet 352 through the first slit 590a and the second slit 590b. The handle portion 192b of the handle assembly 190b can extend through the first sheet 352 through a third slit 590c and a fourth slit 590d, as shown and further described below with respect to FIG. 7C. In the present aspect, each slit 590a,b,c,d, can terminate at a round hole that is concentric to and sized slightly larger than a diameter of the respective handle portion 192a,b. The round holes can provide a tolerance for assembly and prevent tears in the first sheet 352. In other aspects, the handle portions 192a,b can extend outwards through the top end 102 from between the first sheet 352 and the second sheet 354 (shown in FIG. 3) of the extended neck portion 162.

Figure 6:
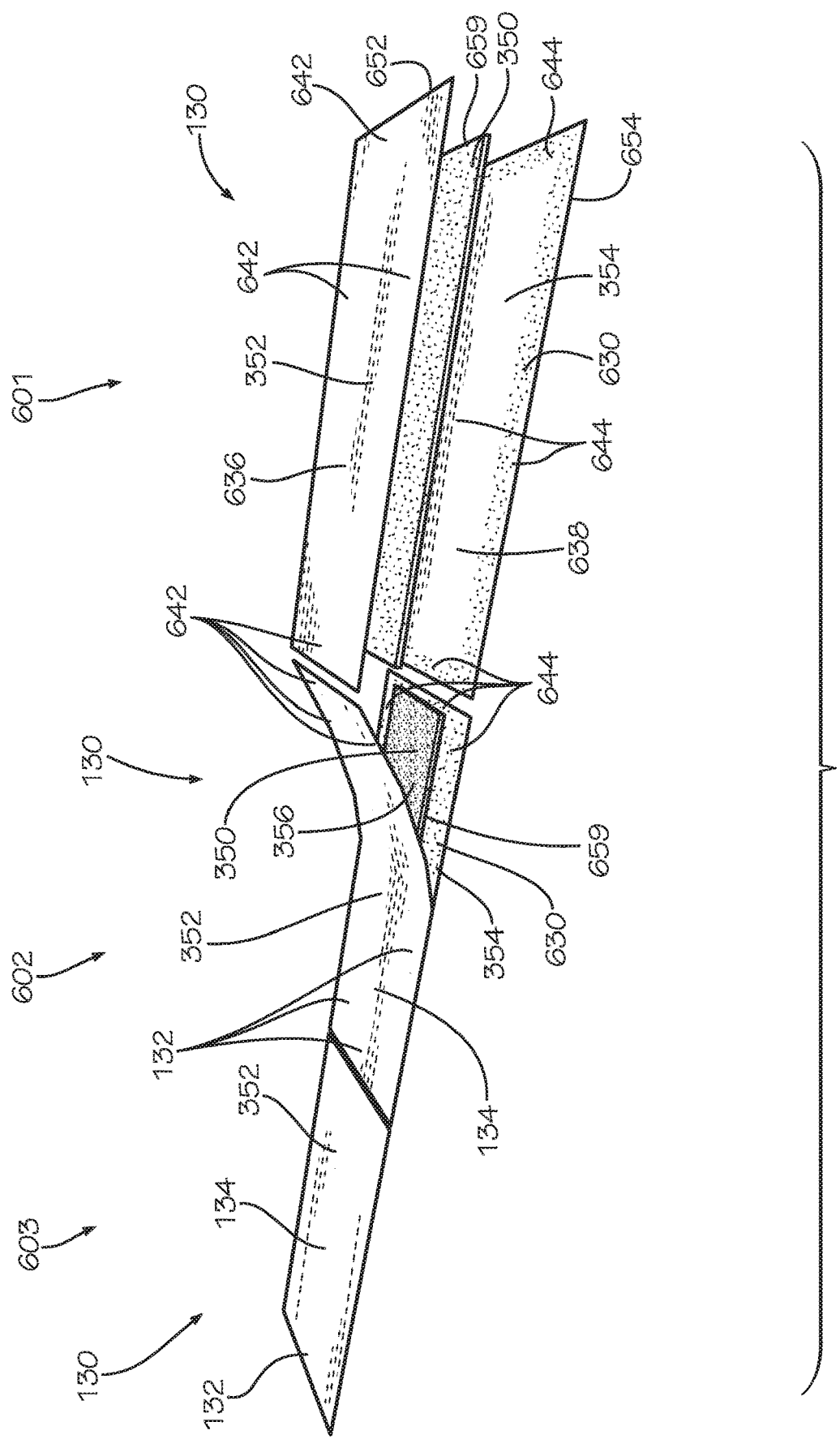
FIG. 6 is a perspective view of a method of manufacturing the insulated panel of FIG. 1.
Figure 7A:
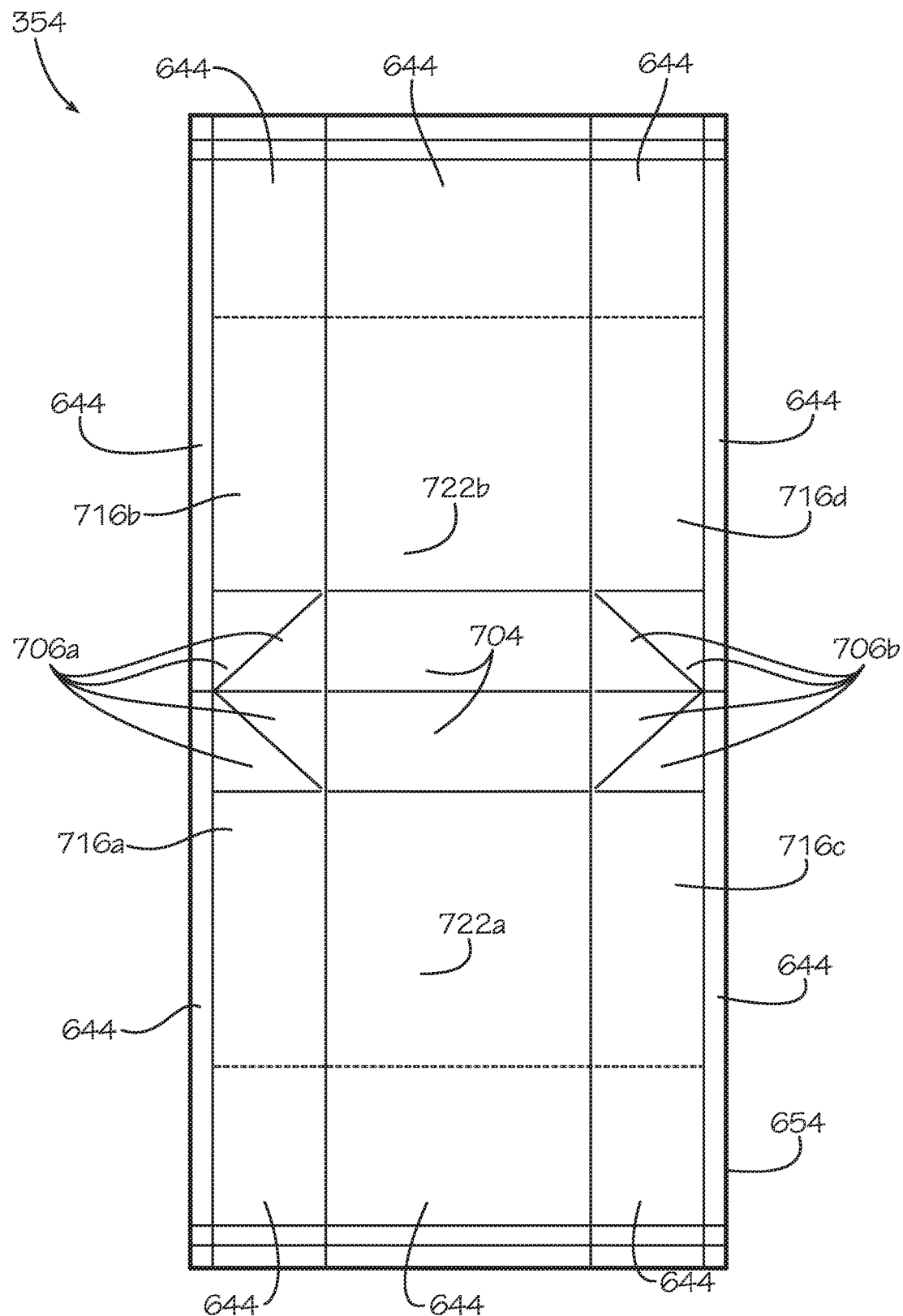
FIG. 7A is a top view of a second sheet of the insulated bag of FIG. 1.
Figure 7B:
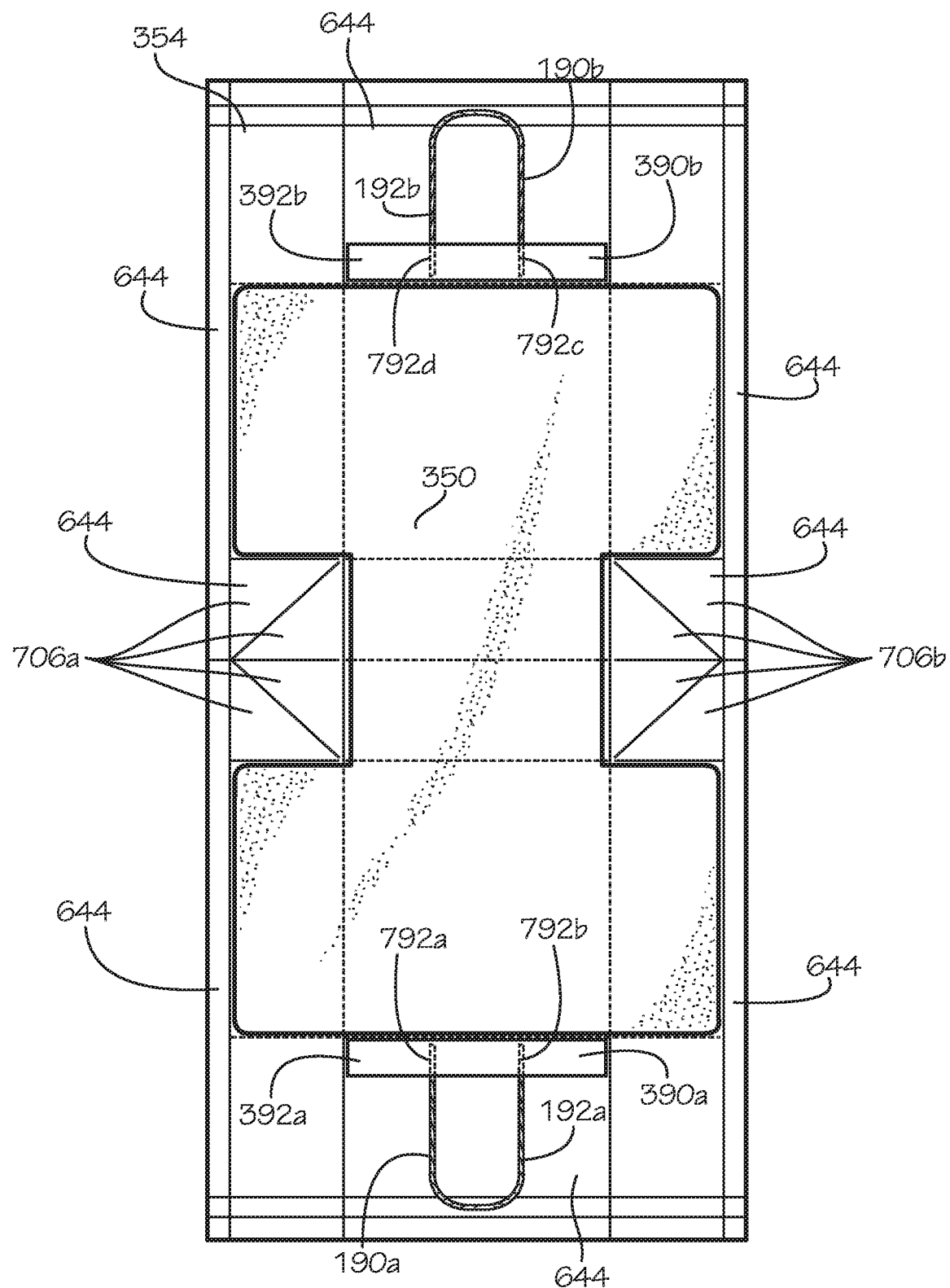
FIG. 7B is a top view of the second sheet, an insulation batt, and a pair of handle assemblies of the insulated bag of FIG. 1.
Figure 7C:
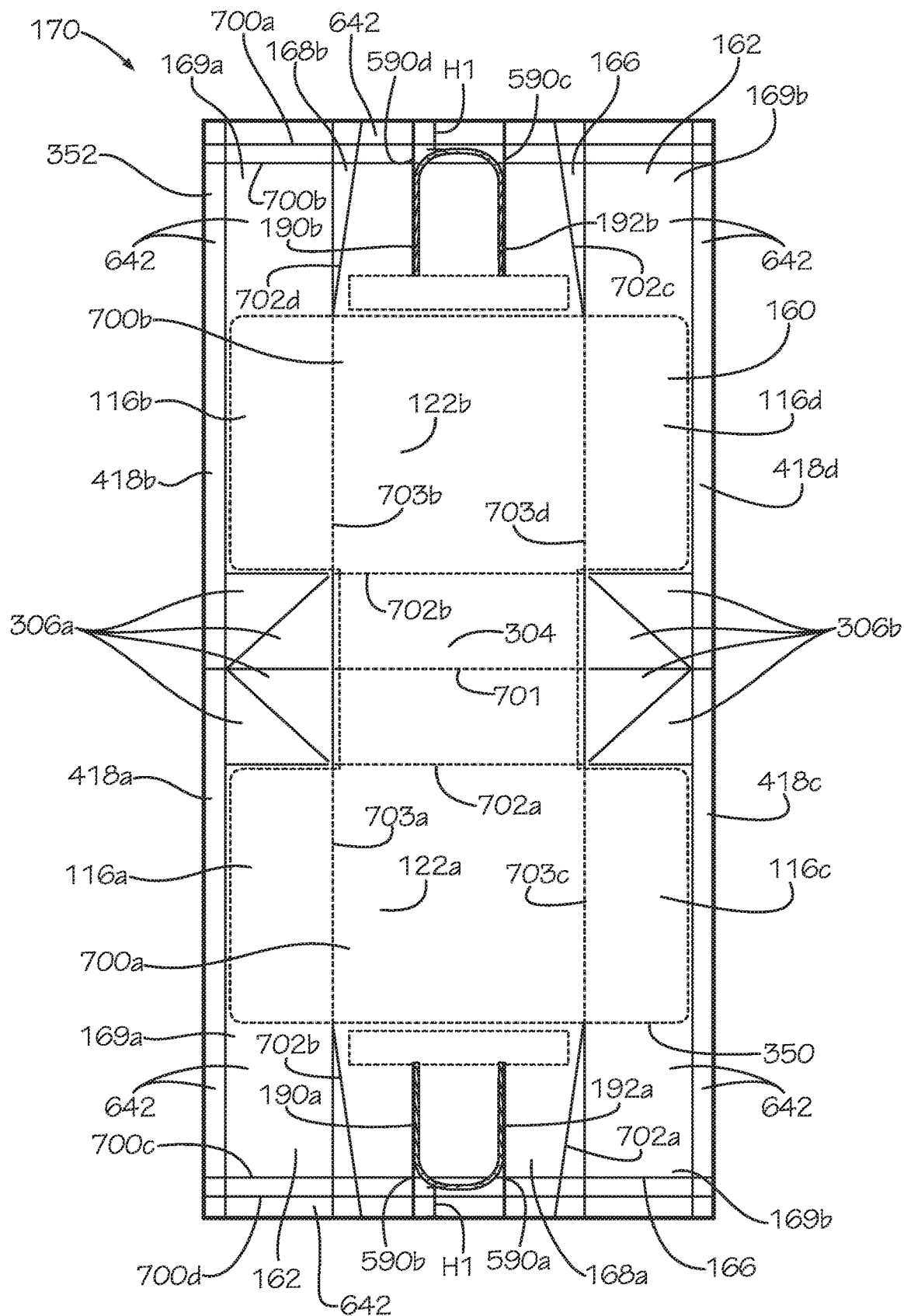
FIG. 7C is a top view of an insulated blank of the insulated bag of FIG. 1.

FIG. 6 is a perspective view of a method of manufacturing for the insulated panel 130. The method can also be applied to the insulated blank 170 as shown in FIGS. 7A-C. In a step 601, the insulation batt 350 can be positioned between the first sheet 352 and the second sheet 354. The first sheet 352 and the second sheet 354 can be sized and shaped complimentary to each other; however in some aspects, the sheets 352, 354 can differ in size and shape. The insulation batt 350 and the sheets 352, 354 can each be flat and substantially planar before assembly. In the present aspect, the insulation batt 350 can be approximately ⅜" thick; however this thickness is not limiting. The thickness can range from under 1/16" to over 2" with a preferred range of ¼" to ½".

The first sheet 352 can define a first outer edge 652, and a portion of the first sheet 352 proximate the first outer edge 652 can define a first perimeter portion 642. The second sheet 354 can define a second outer edge 654, and a portion of the second sheet 354 proximate the second outer edge 654 can define a second perimeter portion 644. The sheets 352, 354 can be sized to overhang the insulation batt 350 on all sides with the first perimeter portion 642 and the second perimeter portion 644 extending beyond a perimeter 659 of the insulation batt 350. The first perimeter portion 642 can encompass a first interior portion 636 of the first sheet 352, and the second perimeter portion 644 can encompass a second interior portion 638 of the second sheet 354. The interior portions 636, 638 can be sized and shaped complimentary to the insulation batt 350.

Surfaces of the sheets 352, 354 facing one another can be treated with an adhesive 630 such as a cohesive. In various aspects, the adhesive can be a glue, epoxy, cement, double-sided tape, mastic, or other suitable adhesive. The surfaces can be entirely treated with the adhesive 630 or selectively treated with the adhesive 630. In the aspect shown, the perimeter portions 642, 644 can be selectively treated with the adhesive 630. In some aspects, the insulation batt 350 can also be adhered to the interior portions 636, 638 of the sheets 352, 354.

In a step 602, the sheets 352, 354 can be aligned and positioned in facing engagement wherein the first perimeter portion 642 can be attached to the second perimeter portion 644 by the adhesive 630. The insulation batt 350 can be aligned between the interior portions 636, 638. Attaching the perimeter portions 642, 644 can form the border 132 of the insulated panel 610 around the perimeter 659 of the insulation batt 350. As depicted in step 602, the border 132 is partially formed around the insulation batt 350.

The border 132 can encapsulate and seal the insulation batt 350 within the panel cavity 356 defined between the interior portions 636, 638 of the sheets 352, 354, respectively. Portions of the insulated panel 610 containing the insulation batt 350 can define the insulated portion 160 of the insulated panel 610. In some aspects, the insulation batt 350 can be aligned off-center from the sheets 352, 354 wherein the border 132 can extend outwards further in some areas than others.

In a step 603, the first perimeter portion 642 has been fully attached to the second perimeter portion 644, thereby forming the completed border 132. Manufacturing of the insulated panel 130 is thus completed; however in some aspects, the method can comprise additional steps such as cutting slots into the border 132. The border 132 can fully encapsulate the insulation batt 350 within the panel cavity 356; however in some aspects, the insulation batt 350 may not be fully encapsulated. In some aspects, the insulation batt 350 can define a complex shape which can comprise curves, notches, cutouts, or other features which can be reflected by complimentary shapes of the border 132 and the insulated portion 160.

In other aspects, the border 132 may not fully encompass and encapsulate the insulation batt 350. In some aspects, some portions of the perimeter 659 may be exposed at an unfinished side or a cutout of the border 132. In some aspects, the insulated panel 130 may not define the border 132 on any portion of the perimeter of the insulated panel 130, and the entire perimeter can define an unfinished edge. In such aspects, the insulated panel 130 can comprise pre-laminated paper and each of the sheets 352, 354 can be attached in facing contact with the insulation batt 350 with, for example and without limitation, an adhesive such as a glue, epoxy, cement, mastic, cohesive, or other suitable material. In some aspects in which the insulated panel 130 defines the border 132, the insulation batt 350 can also be attached in facing contact with one or both of the sheets 352, 354. In some aspects, the pre-laminated paper can be provided in a roll, and the insulated panels 130 can be cut to size from the roll. In other aspects, rather than encapsulating the insulation batt 350 between the first sheet 352 and the second sheet 354, a single sheet (not shown) can be folded substantially into two halves, and the insulation batt 350 can be encapsulated between the two halves of the single sheet.

FIGS. 7A-C show the method of FIG. 6 applied to the manufacture of the insulated blank 170. FIG. 7A is a top view of the second sheet 354 of the insulated blank 170 of the insulated bag 110 of FIG. 1. The second sheet 354 can define the second outer edge 654 extending around the perimeter of the second sheet 354. The portions of the second sheet 354 proximate the second outer edge 654 can define the second perimeter portion 644.

The second sheet 354 can define a pair of opposing main panel portions 722a,b, four side subpanel portions 716a-d, a bottom panel portion 704, and a pair of corner ear portions 706a,b. The main panel portions 722a,b can correspond to the main panels 122a,b (shown in FIG. 4), the side subpanel portions 716a-d can correspond to the side subpanels 116a-d (shown in FIG. 4), and the bottom panel portion 704 can correspond to the bottom panel 304 (shown in FIG. 4). The corner ear portions 706a,b can correspond to the corner ears 306a,b (shown in FIG. 8B).

FIG. 7B is a top view of the second sheet 354 with the insulation batt 350 and the handle assemblies 190a,b positioned atop the second sheet 354. In the present aspect, the insulation batt 350 can define an I-shape, and the insulation batt 350 can cover the opposing main panel portions 722a,b, the side subpanel portions 716a-d, and the bottom panel portion 704 shown in FIG. 7A. In some aspects, the insulation batt 350 can be attached to the second sheet 354 by an adhesive such as a glue, epoxy, cement, mastic, cohesive, or other suitable material. In other aspects, the insulation batt 350 can simply be laminated and encapsulated between the first sheet 352 and the second sheet 354 to secure the insulation batt 350 within the insulated blank 170 (shown in FIG. 8C). In the present aspect, the base portions 390a,b of the handle assemblies 190a,b can be positioned adjacent to the insulation batt 350. The handle portions 192a,b of the handle assemblies 190a,b, respectively, can extend substantially to the second outer edge 654 of the second sheet 354. In other aspects, the handle portions 192a,b can extend past the second outer edge 654. In other aspects, the handle portions 192a,b may not extend to the second outer edge 654.

In the present aspect, the base portions 390a,b of the respective handle assemblies 190a,b can be attached to the second sheet 354 by an adhesive such as a glue, epoxy, cement, mastic, cohesive, or other suitable material. In other aspects, the base portions 390a,b may not be attached to the second sheet 354 and can simply be laminated between the first sheet 352 and the second sheet 354 to secure the base portions 390a,b to the insulated blank 170. As previously described, bottom portions 792a-d of the handle portions 192a,b can be laminated within the base strips 392a,b to secure the handle portions 192a,b to the respective base portions 390a,b.

FIG. 7C is a top view of the insulated blank 170 with the first sheet 352 secured atop the second sheet 354. The main panels 122a,b, the bottom panel 304, and the side subpanels 116a-d can each be defined in the insulated blank 170. The insulated blank 170 can define a centerline 701 substantially bisecting the insulated blank 170 into a first half 700a and a second half 700b. In the present aspect, the first half 700a can be substantially symmetrical to the second half 700b across the centerline 701.

The first sheet 352 can be attached in facing engagement with the underlying second sheet 354 to define the border 166. The border 166 extends around the insulated portion 160 of the insulated blank 170 which contains the insulation batt 350, shown in FIG. 7C in broken lines. The border 166 can define a first portion 418a, a second portion 418b, a third portion 418c, and a fourth portion 418d. The insulated blank 170 can be folded across the centerline 701, and the first portion 418a can be attached in facing engagement to the second portion 418b to form the first side seam 118a, as shown in FIG. 4. The third portion 418c can also be attached in facing engagement to the fourth portion 418d to form the second side seam 118b, as shown in FIG. 4. The border 166 can also define the extended neck portion 162, including the main neck portions 168a,b and the side neck portions 169a,b. The border 166 can also define the corner ears 306a,b, shown in an unfolded configuration. Portions of the border 166 defining the extended neck portion 162 and the corner ears 306a,b can extend outwards a greater distance from the insulated portion 160 than the portions 418a-d.

The insulated portion 160 of the insulated blank 170 can also define a first bottom fold line 702a and a second bottom fold line 702b. The first bottom fold line 702a can be defined between the first main panel 122a and the bottom panel 304. The second bottom fold line 702b can be defined between the second main panel 122b and the bottom panel 304. The main panels 122a,b can be configured to fold relative to the bottom panel 304 about the respective bottom fold lines 702a,b.

The insulated blank 170 can also define a first side fold line 703a, a second side fold line 703b, a third side fold line 703c, and a fourth side fold line 703d. The first side fold line 703a can be defined between the first main panel 122a and the first side subpanel 116a. The second side fold line 703b can be defined between the second main panel 122b and the second side subpanel 116b. The third side fold line 703c can be defined between the first main panel 122a and the third side subpanel 116c. The fourth side fold line 703d can be defined between the second main panel 122b and the fourth side subpanel 116d. The side subpanels 116a-b can be configured to fold relative to the adjacent main panels 122a,b about the respective side fold lines 703a-d.

As previously described relative to FIG. 5, the handle portions 192a,b of the respective handle assemblies 190a,b can extend outwards from the border 166 through the first sheet 352 through the slits 590a-d. The first handle portion 192a can extend outwards through the first slit 590a and the second slit 590b. The second handle portion 192b can extend outwards through the third slit 590c and the fourth slit 590d. In the present aspect, with the handle portions 192a,b in a relaxed state, the border 166 can extend beyond the handle portions 192a,b by a height $H_1$. In the present aspect, the height $H_1$ can define a value of ⅜"; however, in other aspects, the height $H_1$ can be larger or smaller than ⅜". The height $H_1$ can provide clearance for trimming the border 166 without accidentally cutting the handle portion 192a,b.

The insulated blank 170 can be pre-creased in order to strength the roll top seal 240 (shown in FIG. 3). The insulated blank 170 can define a plurality of roll top creases 700a,b,c,d. The roll top creases 700a,b, can extend across the side neck portions 169a,b and the second main neck portion 168b, and the roll top creases 700c,d can extend across the side neck portions 169a,b and the first main neck portion 168a. The roll top creases 700a,b,c,d can bias the border 166 to consistently form and maintain the roll top seal 240 once rolled. The first main neck portion 168a can also define the creases 702a,b which can be configured to facilitate inward folding of the side neck portions 169a,b relative to the first main neck portion 168a when the roll top seal 240 is formed. The second main neck portion 168b can also define the creases 702c,d which can be configured to facilitate inward folding of the side neck portions 169a,b relative to the second main neck portion 168b when the roll top seal 240 is formed.

Figure 8A:
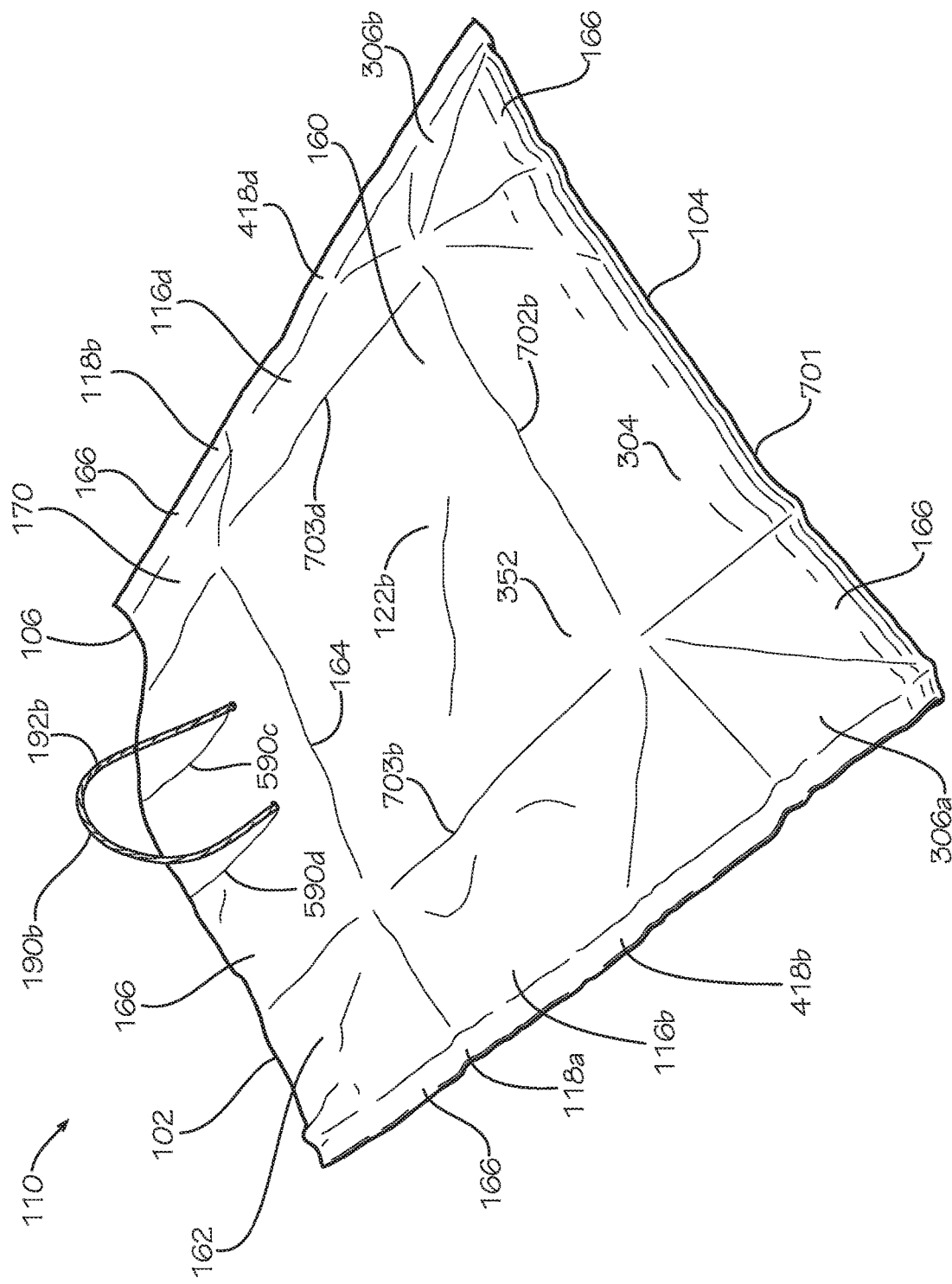
FIG. 8A is a perspective view of the insulated bag of FIG. 1 in a sack configuration.
Figure 8B:
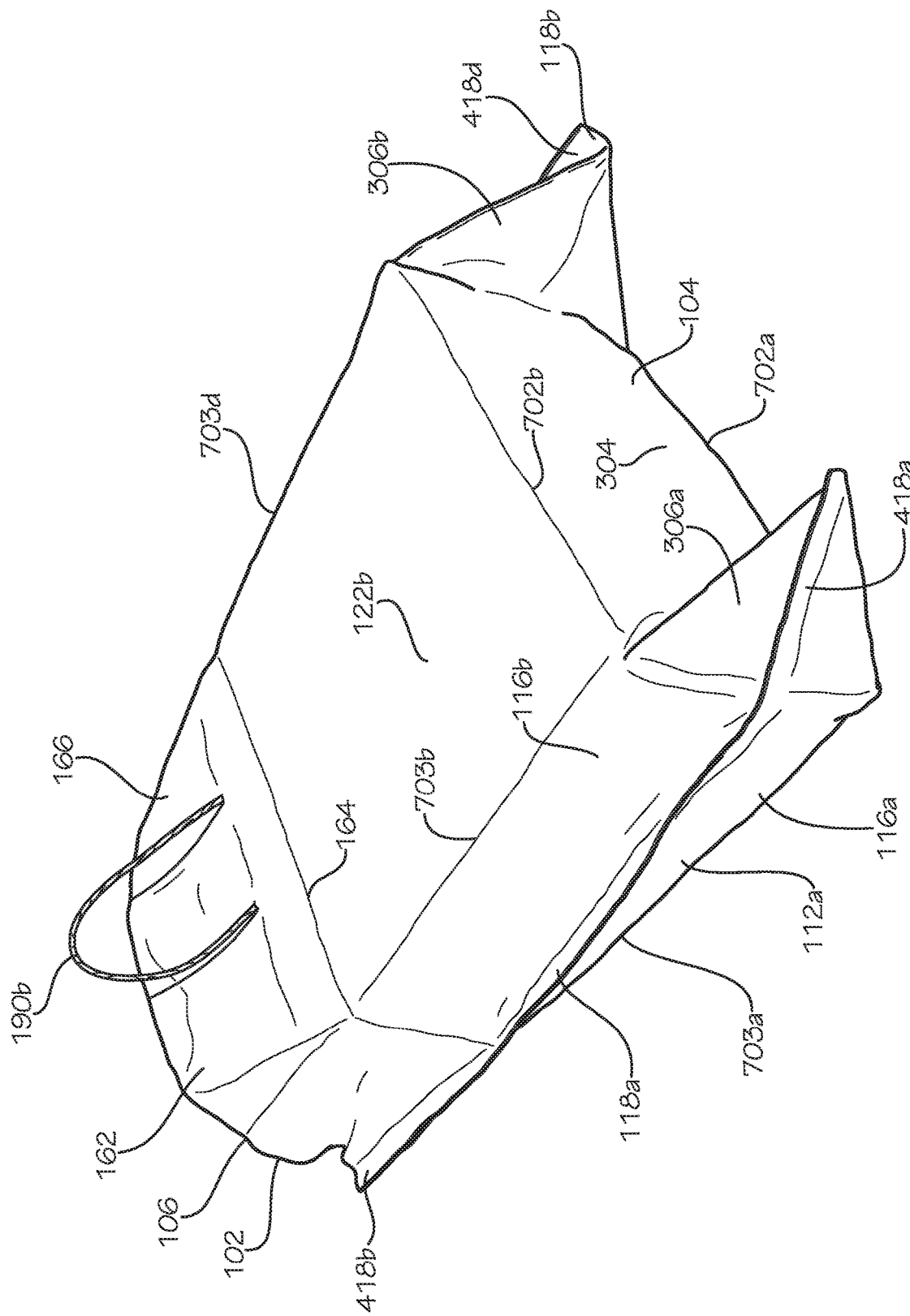
FIG. 8B is a perspective view of the insulated bag of FIG. 1 in an interim configuration.
Figure 8C:
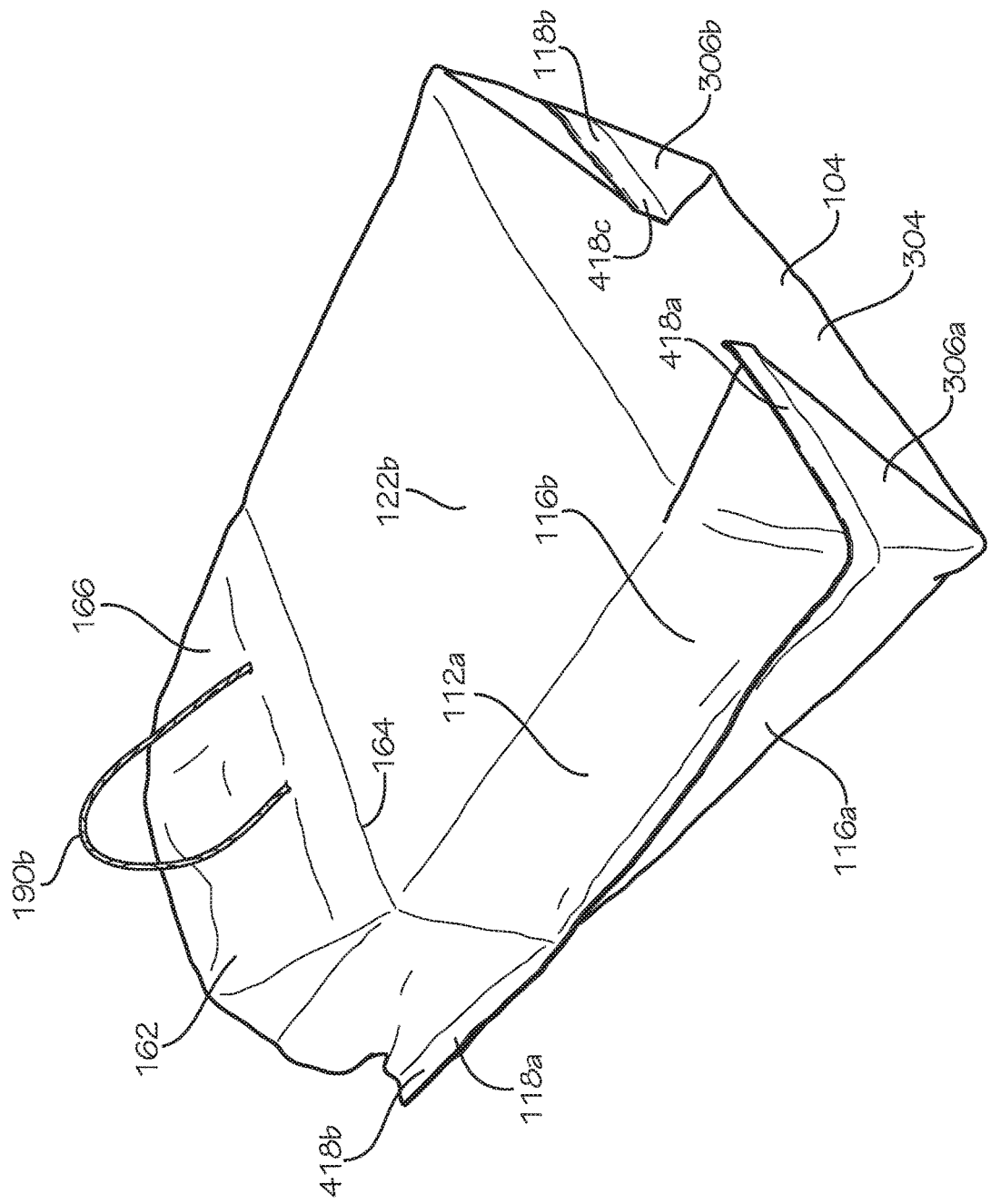
FIG. 8C is a perspective view of the insulated bag of FIG. 1 in an open configuration.

FIGS. 8A-C show a method of assembling the insulated bag 110 of FIG. 1 from the insulated blank 170 of FIG. 7C. FIG. 8A is a perspective view of the insulated bag 110 of FIG. 1 in a sack configuration. In the present aspect, the sack configuration is an intermediate manufacturing step for the insulated bag 110; however in other aspects, the sack configuration can be a finished product, and the insulated bag 110 can be used in the sack configuration. In aspects in which the sack configuration can be the finished product, it can be desirable to insulate the corner ears 306a,b by encapsulating a rectangular-shaped insulation batt 350 within the insulated blank 170 rather than the I-shaped insulated batt 350 shown in FIG. 7B.

To form the sack configuration, the insulated blank 170 can be folded in half about the centerline 701 such that the first sheet 352 faces outwards, and the second sheet 354 defines the bag cavity 108 (shown in FIG. 3). With the insulated blank 170 folded in half, the first portion 418a (shown in FIG. 7C) and the second portion 418b of the border 166 can be attached together in facing engagement to form the first side seam 118a. The third portion 418c (shown in FIG. 7C) and the fourth portion 418d of the border 166 can be attached together in facing engagement to form the second side seam 118b.

FIG. 8B is a perspective view of the insulated bag 110 of FIG. 1 in an interim configuration. To reconfigure the insulated bag 110 from the sack configuration to the interim configuration, the first side subpanel 116a can be folded relative to the first main panel 122a (shown in FIG. 7C) about the first side fold line 703a such that the first side subpanel 116a can be substantially perpendicular to the first main panel 122a. The second side subpanel 116b can be folded relative to the second main panel 122b about the second side fold line 703b such that the second side subpanel 116b can be substantially perpendicular to the second main panel 122b. The first side subpanel 116a can be substantially coplanar with the second side subpanel 116b.

The third side subpanel 116c (shown in FIG. 7C) can be folded relative to the first main panel 122a about the third side fold line 703c (shown in FIG. 7C) such that the third side subpanel 116c can be substantially perpendicular to the first main panel 122a. The fourth side subpanel 116d (shown in FIG. 7C) can be folded relative to the second main panel 122b about the fourth side fold line 703d such that the fourth side subpanel 116d can be substantially perpendicular to the second main panel 122b. The third side subpanel 116c can be substantially coplanar with the fourth side subpanel 116d.

Additionally, the first main panel 122a can be folded relative to the bottom panel 304 about the first bottom fold line 702a such that the first main panel 122a can be substantially perpendicular to the bottom panel 304. The second main panel 122b can be folded relative to the bottom panel 304 about the second bottom fold line 702b such that the second main panel 122b can be substantially perpendicular to the bottom panel 304. The bottom panel 304 can be unfolded to a substantially planar configuration. Once the main panels 122a,b are folded relative to the bottom panel 304, the corner ears 306a,b can extend outwards from the bottom panel 304 in a folded configuration as shown.

As shown in FIG. 8C, the corner ears 306a,b can be folded downwards and can be attached to the bottom panel 304 of the insulated bag 110 to complete the assembly of the insulated bag 110. The corner ears 306a,b can be in an attached configuration wherein the corner ears can be attached to the bottom panel 304 by an adhesive, such as a glue, cement, epoxy, mastic, cohesive, or double-sided tape. In other aspects, the corner ears 306a,b can be folded upwards and attached to the side panels 112a,b to complete the insulated bag 110. The completed insulated bag 110 is shown in the open configuration previously shown in FIG. 1.

In the present aspect, the sheets 352, 354 can comprise paper, such as kraft paper; however, in other embodiments, the sheets can comprise posterboard, cardboard, plastic sheeting, cloth, or any other suitable material. In some aspects, the sheets can comprise a water-proof or water-resistant material, such as water-proof paper. In some aspects, a one of the sheets 352, 354 of the insulated bag assembly 100 can comprised a material different from another of the sheets 352, 354. The insulation batts 350 can comprise paper or other paper fiber materials; however, in other aspects, the insulation batts can comprise cotton, foam, rubber, plastics, fiberglass, mineral wool, or any other flexible insulation material.

In the present application, the insulation batts 350 can be repulpable. In the present aspect, the insulated bag assembly 100 can be 100% recyclable. In the present aspect, the insulated bag assembly 100 can be single-stream recyclable wherein all materials comprised by the insulated bag assembly 100 can be recycled by a single processing train without requiring separation of any materials or components of the insulated bag assembly 100. In the present aspect, the insulated bag assembly 100 can be compostable. In the present aspect, the insulated bag assembly 100 can be repulpable.

In the present aspect, insulated bag assembly 100 and each of the insulated bag 110 and the insulated panels 130 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, insulated bag assembly 100 and each of the insulated bag 110 and the insulated panels 130 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The insulated bag assembly 100 can be used in applications in which a user or mail carrier transports perishable or temperature-sensitive goods. For example and without limitation, the insulated bag assembly 100 can be used to transport groceries. The insulated bag assembly 100 can improve upon a common plastic grocery bag by providing insulation to prevent spoilage of the contents.

Common plastic grocery bags are not accepted by many recycling facilities or curb-side recycling programs in which a waste management service collects recyclables at a user's home. Consequently, many common plastic grocery bags are deposited in landfills where the plastic grocery bags decompose very slowly, sometimes over the course of several centuries. In some instances, plastic grocery bags can enter the oceans where the plastic grocery bags can remain for years and harm marine life. In some aspects, the insulated bag assembly 100 can reduce waste and pollution by comprising materials which are recyclable or biodegradable. In aspects in which the insulated bag assembly 100 is curb-side or single-stream recyclable, the user may be more likely to recycle the insulated bag assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated bag comprising:
   a pair of opposing main panels;
   a pair of opposing side panels, each side panel attached to each main panel, the main panels and the side panels defining a bag cavity within the insulated bag, the insulated bag defining a top end and a bottom end, a bag opening to the bag cavity defined at the top end; and
   a handle assembly, the handle assembly comprising a handle portion attached to a base portion, the base portion comprising a base strip, the base strip comprising a first strip and a second strip attached together in facing engagement, a bottom portion of the handle portion being laminated between the first strip and the second strip;
   the main panels and the side panels defined in an insulated blank, the insulated blank comprising an insulation batt, a first sheet, and a second sheet, the insulation batt encapsulated between the first sheet and the second sheet, the first sheet attached in facing engagement with the second sheet to form a border, the border extending around a perimeter of the insulation batt, the base portion of the handle assembly being laminated within the border between the first sheet and the second sheet, the border defining at least one slit extending from the top end to the base strip, the at least one slit defined by the first sheet of the border, the handle portion extending outward from the border through the first sheet.

2. The insulated bag of claim 1, further comprising a bottom panel, wherein:
   the bottom panel is disposed at the bottom end; and
   a side seam extends from the bottom panel to the top end of the insulated bag.

3. The insulated bag of claim 2, wherein a one of the side panels comprises a pair of side subpanels joined together by the side seam.

4. The insulated bag of claim 2, wherein:
   the insulated blank defines a centerline;
   the centerline defines a first half and a second half of the insulated blank;
   a first side border portion of the border is defined by the first half;
   a second side border portion of the border is defined by the second half; and
   the first side border portion is attached in facing engagement with the second side border portion to form the side seam.

5. The insulated bag of claim 4, wherein the first half is symmetrical to the second half across the centerline.

6. The insulated bag of claim 4, wherein the border is two-ply, and wherein the side seam is four-ply.

7. The insulated bag of claim 1, wherein:
   an extended neck portion of the border extends around the bag opening; and
   the extended neck portion is attached to both main panels.

8. The insulated bag of claim 1, wherein the insulated bag further comprises a corner ear and a bottom panel, wherein the corner ear is positioned between the bottom panel and a one of the pair of opposing side panels, and wherein the corner ear is folded downwards and attached to the bottom panel.

9. An insulated bag assembly comprising:
   an insulated bag, the insulated bag comprising:
      a pair of opposing main panels, the pair of opposing main panels defining a bag cavity within the insulated bag, the insulated bag defining a top end and a bottom end, and a bag opening to the bag cavity defined at the top end; and
      a handle assembly, the handle assembly comprising a handle portion attached to a base portion, the base portion comprising a base strip, the base strip comprising a first strip and a second strip attached together in facing engagement, a bottom portion of the handle portion being laminated between the first strip and the second strip;
      the pair of opposing main panels defined in an insulated blank, the insulated blank comprising an insulation batt, a first sheet, and a second sheet, the insulation batt encapsulated between the first sheet and the second sheet, the first sheet attached in facing engagement with the second sheet to form a border, the border extending around a perimeter of the insulation batt, the base portion of the handle assembly being laminated within the border between the first sheet and the second sheet, the border defining at least one slit extending from the top end to the base strip, the at least one slit defined by the first sheet of the border, and the handle portion extending outward from the border through the first sheet; and
   an insulated panel, the insulated panel positioned within the bag cavity, the insulated panel comprising an insulation panel batt, a first panel sheet, and a second panel sheet, the insulation panel batt encapsulated between the first panel sheet and the second panel sheet, the first panel sheet attached in facing engagement with the second panel sheet to form a panel border, the panel border extending around a panel perimeter of the insulation panel batt, the panel border of the insulated panel forming a seal with the insulated bag.

10. The insulated bag assembly of claim 9, wherein the insulated panel partitions the bag cavity into a first compartment and a second compartment.

11. The insulated bag assembly of claim 9, wherein:
    a first side subpanel is attached to a first main panel of the pair of main panels;
    a second side subpanel is attached to a second main panel of the pair of main panels; and
    the first side subpanel is attached to the second side subpanel by a side seam to form a side panel.

12. The insulated bag assembly of claim 11, wherein a first side portion of the border is attached in facing engagement with a second side portion of the border to form the side seam.

13. The insulated bag assembly of claim 9, wherein:
    a portion of the border extending around the bag opening defines an extended neck; and
    the bag opening is sealed by rolling opposing portions of the extended neck together to form a roll top seal.

14. The insulated bag assembly of claim 9, wherein:
the first sheet defines a first corner ear portion;
the second sheet defines a second corner ear portion;
the insulation batt defines a first cutout positioned to align with the first corner ear portion and the second corner ear portion;
the first corner ear portion is attached in facing engagement with the second corner ear portion to form a corner ear; and
the corner ear is uninsulated.

15. The insulated bag assembly of claim 14, wherein:
the insulated bag comprises a bottom panel attached to both of the opposing main panels; and
the corner ear is folded downwards and attached to the bottom panel.

16. A method for forming an insulated bag, the method comprising:
positioning an insulation batt between a first sheet and a second sheet;
attaching the first sheet and the second sheet in facing engagement to form a border, the border extending around a perimeter of the insulation batt, the border encapsulating the insulation batt and forming an insulated blank;
laminating a base portion of a handle assembly within the border, the base portion comprising a base strip, the base strip comprising a first strip and a second strip attached together in facing engagement, a bottom portion of a handle portion of the handle assembly being laminated between the first strip and the second strip;
cutting a slit through a portion of the first sheet, the portion of the first sheet being attached in facing engagement to the second sheet to form the border, the slit extending from an edge of the border to the base strip;
pulling the handle portion of the handle assembly through the slit
attaching a first portion of the border to a second portion of the border in facing engagement to form a seam; and
folding the insulated blank along a fold line to form the insulated bag.

17. The method of claim 16, wherein:
the seam is a first side seam; and
the method further comprises attaching a third portion of the border to a fourth portion of the border in facing engagement to form a second side seam.

18. The method of claim 16, further comprising folding the insulated blank along a first bottom fold line and a second bottom fold line to form a first main panel, a second main panel, and a bottom panel.

19. The method of claim 18, further comprising folding a pair of corner ears downwards and attaching the corner ears to the bottom panel.

20. The method of claim 16, wherein the border is two-ply, and wherein the seam is four-ply.

* * * * *